US005719998A

United States Patent [19]
Ku et al.

[11] Patent Number: 5,719,998
[45] Date of Patent: Feb. 17, 1998

[54] PARTITIONED DECOMPRESSION OF AUDIO DATA USING AUDIO DECODER ENGINE FOR COMPUTATIONALLY INTENSIVE PROCESSING

[75] Inventors: Charlene S. Ku, Palo Alto; Charles C. Stearns; Olive T. Tao, both of San Jose, all of Calif.

[73] Assignee: S3, Incorporated, Santa Clara, Calif.

[21] Appl. No.: 489,489

[22] Filed: Jun. 12, 1995

[51] Int. Cl.⁶ .................................................. G10L 7/04
[52] U.S. Cl. ...................... 395/2.91; 395/2.67; 395/2.78
[58] Field of Search ............................ 395/2.67, 2.78, 395/2.91

[56] References Cited

U.S. PATENT DOCUMENTS

| | | | |
|---|---|---|---|
| 4,296,279 | 10/1981 | Stork | 395/2.73 |
| 4,799,262 | 1/1989 | Feldman et al. | 395/2.5 |
| 4,991,217 | 2/1991 | Garrett et al. | 395/2.44 |
| 5,386,493 | 1/1995 | Degen et al. | 395/2.76 |

FOREIGN PATENT DOCUMENTS

| | | |
|---|---|---|
| 0 624 040 | 11/1994 | European Pat. Off. . |
| 94 10802 | 5/1994 | WIPO . |

OTHER PUBLICATIONS

Gruger, K, et al.: "MPEG-1 low cost encoder solution", 20 Mar. 1995, Proceedings of the SPIE-The International Society for Optical Engineering, 1995, USA, vol. 2451, ISSN 0277-78X, pp. 41-51, XP000577418.

Tamitani, I, et al.: "LSIs for audio and video MPEG standards":, NEC Research and Development, Oct. 1994, Japan, vol. 35, No. 4, ISSN 0547-051X, pp. 355-365, XP000496855.

Morris, L. R.: "Real-time spectrograms via hardware/software PC enhancement", Speech Technology, Aug-Sep. 1985, USA, vol. 3, No.1, ISSN 0744-1355, pp. 77-79, XP000577297.

Karlheinz Brandenburg and Gerhard Stoll, et al, "ISO-MPEG-1 Audio: A Generic Standard for Coding of High-Quality Digital Audio", J. Audio Engineering Soc., vol. 42, No. 10, p.780-792, Oct. 1994.

*Primary Examiner*—Allen R. MacDonald
*Assistant Examiner*—Tālivaldis Ivars Šmits
*Attorney, Agent, or Firm*—Skjerven, Morrill, MacPherson, Franklin & Friel; Norman R. Klivans

[57] ABSTRACT

Decompression of MPEG compressed audio data is performed in a computer system by the host processor in the computer system providing preprocessing data decompression and a dedicated audio decoder engine (which is a digital signal processor) performing the filtering and windowing of the host preprocessed data. The audio decoder engine includes a data path, instruction set, registers and internal program and data memory. The host performs a large portion of the audio decompression, leaving the windowing and filtering to the audio decoder engine. Thus the computationally intensive portions of the decompression are performed more efficiently. Coefficient storage in the audio decompression engine is optimized by taking advantage of the symmetries inherent in the coefficient data, both for the filter coefficients and the windowing coefficients. Double buffer input and output buffers speed the data flow between the host processor and the audio decoder engine. The double buffers allow a continuous flow of data from the host processor to the audio decoder engine.

9 Claims, 5 Drawing Sheets

Microfiche Appendix Included
(2 Microfiche, 156 Pages)

| Logical Start Addr | Logical End Addr | Physical Start Addr | Physical End Addr | Description | Negate |
|---|---|---|---|---|---|
| 0000H | 001FH | 0000H | 000FH | FILTER GROUP 0 | |
| 0020H | 003FH | 0010H | 001FH | FILTER GROUP 1 | 2nd half |
| 0040H | 005FH | 0020H | 002FH | FILTER GROUP 2 | |
| 0060H | 007FH | 0030H | 003FH | FILTER GROUP 3 | 2nd half |
| 0080H | 009FH | 0040H | 004FH | FILTER GROUP 4 | |
| 00A0H | 00BFH | 0050H | 005FH | FILTER GROUP 5 | 2nd half |
| 00C0H | 00DFH | 0060H | 006FH | FILTER GROUP 6 | |
| 00E0H | 00FFH | 0070H | 007FH | FILTER GROUP 7 | 2nd half |
| 0100H | 011FH | 0080H | 008FH | FILTER GROUP 8 | |
| 0120H | 013FH | 0090H | 009FH | FILTER GROUP 9 | 2nd half |
| 0140H | 015FH | 00A0H | 00AFH | FILTER GROUP 10 | |
| 0160H | 017FH | 00B0H | 00BFH | FILTER GROUP 11 | 2nd half |
| 0180H | 019FH | 00C0H | 00CFH | FILTER GROUP 12 | |
| 01A0H | 01BFH | 00D0H | 00DFH | FILTER GROUP 13 | 2nd half |
| 01C0H | 01DFH | 00E0H | 00EFH | FILTER GROUP 14 | |
| 01E0H | 01FFH | 00F0H | 00FFH | FILTER GROUP 15 | 2nd half |
| 0200H | 021FH | 0100H | 010FH | FILTER GROUP 33 | 2nd half |
| 0220H | 023FH | 0110H | 011FH | FILTER GROUP 34 | |
| 0240H | 025FH | 0120H | 012FH | FILTER GROUP 35 | 2nd half |
| 0260H | 027FH | 0130H | 013FH | FILTER GROUP 36 | |
| 0280H | 029FH | 0140H | 014FH | FILTER GROUP 37 | 2nd half |
| 02A0H | 02BFH | 0150H | 015FH | FILTER GROUP 38 | |
| 02C0H | 02DFH | 0160H | 016FH | FILTER GROUP 39 | 2nd half |
| 02E0H | 02FFH | 0170H | 017FH | FILTER GROUP 40 | |
| 0300H | 031FH | 0180H | 018FH | FILTER GROUP 41 | 2nd half |
| 0320H | 033FH | 0190H | 019FH | FILTER GROUP 42 | |
| 0340H | 035FH | 01A0H | 01AFH | FILTER GROUP 43 | 2nd half |
| 0360H | 037FH | 01B0H | 01BFH | FILTER GROUP 44 | |
| 0380H | 039FH | 01C0H | 01CFH | FILTER GROUP 45 | 2nd half |
| 03A0H | 03BFH | 01D0H | 01DFH | FILTER GROUP 46 | |
| 03C0H | 03DFH | 01E0H | 01EFH | FILTER GROUP 47 | 2nd half |
| 05F0H | 06EFH | 01F0H | 02EFH | WINDOW, coeffs 0–225 | |
| | | 02F0H | | WINDOW, coeff 256 (negated) LAST ROM LOCATION | yes |
| 0AF0H | 09F1H | 02F0H | 01F1H | WINDOW, coeffs 256–511, reverse order | all except coeffs 64,128,192 |

*FIG. 4*

PARTITIONED DECOMPRESSION OF AUDIO DATA USING AUDIO DECODER ENGINE FOR COMPUTATIONALLY INTENSIVE PROCESSING

CROSS-REFERENCE TO RELATED APPLICATION

This application is related to copending and commonly owned U.S. patent applications Ser. No. 08/489,488, filed Jun. 12, 1995, entitled "Decompression of MPEG Compressed Data in a Computer System", Charles C. Stearns, and Ser. No. 08/490,322, filed Jun. 12, 1995, entitled "Video Decoder Engine", Soma Bhattacharjee et al., both incorporated by reference.

MICROFICHE APPENDIX

A microfiche appendix including 2 fiche and a total of 156 frames is a part of this disclosure.

BACKGROUND OF THE INVENTION

1. Field of the Invention

This invention relates to data decompression and more specifically to decompression of MPEG compressed audio data in a computer system.

2. Description of the Prior Art

The well-known MPEG (Motion Pictures Experts Group) data standard defines two compression/decompression processes, conventionally called MPEG 1 and MPEG 2. For purposes of this disclosure, MPEG 1 and MPEG 2 are similar. The MPEG 1 standard is described in the ISO publication number ISO/IEC 11172: 1993(E), "Coding For Moving Pictures and Associated Audio . . . ", and the MPEG 2 standard is defined in the ISO Publication No. ISO/IEC 13818-2, both incorporated by reference herein in their entirety. The MPEG standard defines the format of compressed audio and video data especially adapted for motion pictures or other live video. MPEG compression is also suitable for other types of data including still pictures, text, etc. The MPEG standard in brief (the above-mentioned publications are more complete) defines a particular data format structure for both video and audio. The MPEG system layer which is a part of the MPEG data structure contains control data describing the video and audio layers.

There are commercially available integrated circuits (chips) for MPEG decompression. Examples are those sold by C-Cube Microsystems and called the CL-450 and CL-480 products. In these chips the MPEG audio and visual decompression (of all layers) is accomplished completely by dedicated circuitry in an internally programmable microcontroller. Thus the entire MPEG content is decompressed using the C-Cube Microsystems chips. Thus, these products accomplish the entire decompression of both audio and video on their own, because these chips are intended for use in consumer type devices (not for computers). Thus, these chips include a system memory, a CD-ROM controller and any necessary processing power for complete MPEG decompression.

Similar products are commercially available from a variety of companies. While these products perform the decompression task fully in a functional manner, they are relatively expensive due to their inclusion of the large number of functions dedicated to MPEG decompression. Thus, their commercial success has been limited by high cost.

SUMMARY

It has been recognized by the present inventors that in a computer (i.e., personal computer or work station) environment, that already available elements are capable of performing a large portion of the MPEG audio decompression task. In accordance with the present invention, the decompression of MPEG audio compressed data is partitioned between a dedicated (hardware) digital signal processor and software (a software driver) which is executed by a host microprocessor conventionally present in a computer system. This partitioning is parallel to the partitioning of the decompression of video data described in the above-referenced patent application.

In accordance with the present invention, the computationally intensive portions of MPEG audio decompression are carried out by a dedicated processor (digital signal processor) called herein the "Audio Decoder Engine" (ADE). The audio decoder engine has several aspects including partitioning of the decompression process, partitioning of the memory which supports the decompression process, symmetry of storage of the decompression coefficients, and a double buffered start with interrupts. The efficient storage of the decompression coefficients allows the memory size and therefore the chip size to be minimized and hence reduces cost. The interrupt start feature ensures that audio data will not overflow or underflow, by timing the decompression cycles so that the output data appears as soon as necessary but not before. The provision of audio decoder engine local memory reduces data transfers to and from an associated private memory and hence speeds up the decompression process.

The audio decoder engine is in one embodiment a fast RISC, digital signal processor intended for MPEG 1 (in one embodiment) audio decompression. The ADE does not perform the entire MPEG-1 decompression process, but instead performs the function of filtering and windowing of the host preprocessed data after the host processor, using a software driver, has performed the upper level audio decompression.

The ADE includes partitioning to decompress data. First, the actual decompression process is partitioned between the ADE and the host processor. Additionally, the local memory in the ADE is used in conjunction with the on-chip private memory to partition the storage of data. Data that is used frequently is stored within the ADE, while intermediate output data is stored in the private memory which interfaces with the chip through the Memory Interface Unit (MIU).

Coefficient storage in the ADE memory is optimized by taking advantage of symmetries observed by the present inventors inherent in the coefficient data. There are 2,048 filter coefficients, but by taking advantage of their symmetry, the number that is actually stored is reduced to 496. Similarly, there are 512 windowing coefficients required for MPEG 1 decompression, but that number has been found to be reducible to 257 for storage.

Interaction of the host processor and the ADE during a decompression operation is enhanced by provision of double buffered input and output buffers. These double buffers allow a continuous flow of data without underflow or overflow from a host processor to the ADE. To minimize idle time, the ADE can start the next command when it receives an interrupt from the host. This interrupt is a signal to the ADE that all data is ready and the ADE may proceed on to the next command. The ADE hence will start operation on the next clock cycle.

BRIEF DESCRIPTION OF THE DRAWINGS

FIG. 4 shows coefficient memory organization in accordance with the present invention.

DETAILED DESCRIPTION

Figure 1:
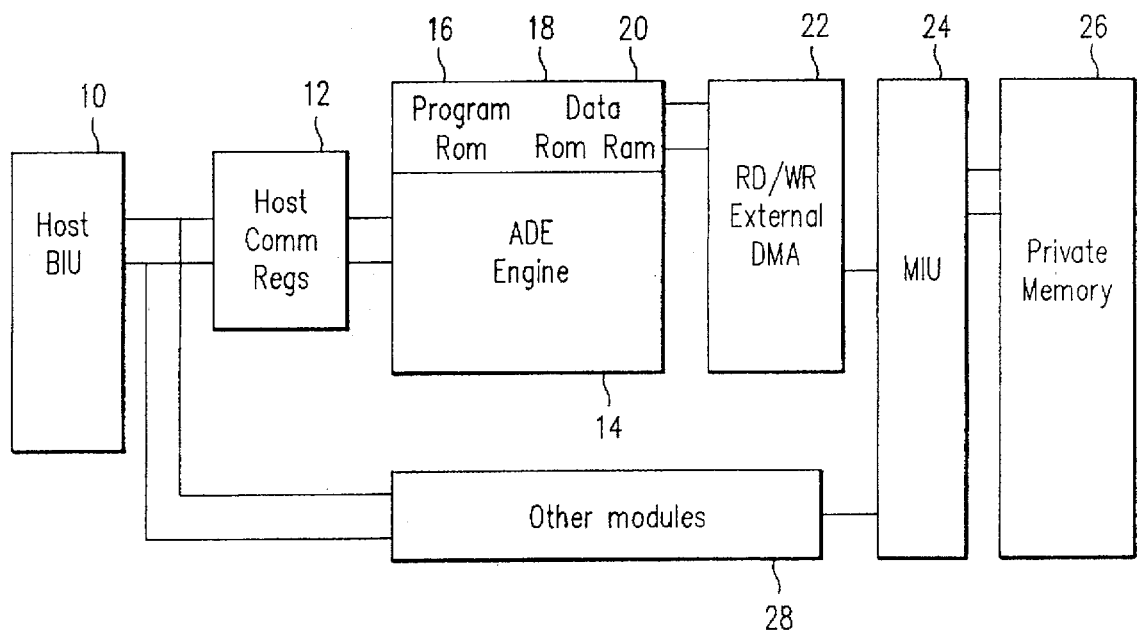
FIG. 1 shows the audio decoder engine (ADE) as a portion of a larger integrated circuit which includes other functions including video decompression.
Figure 2:
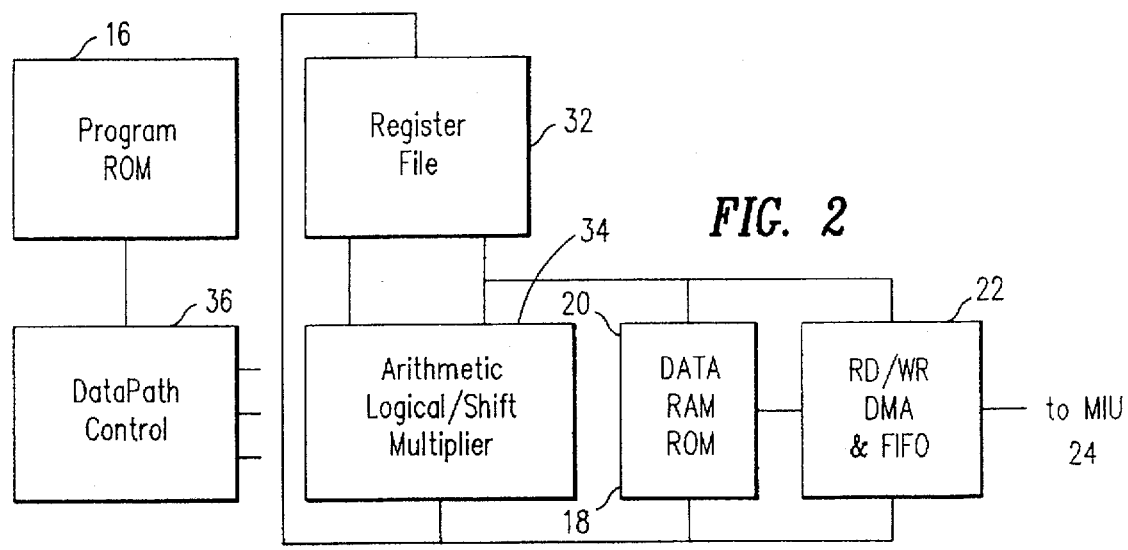
FIG. 2 shows in a block diagram the ADE.
Figure 3:
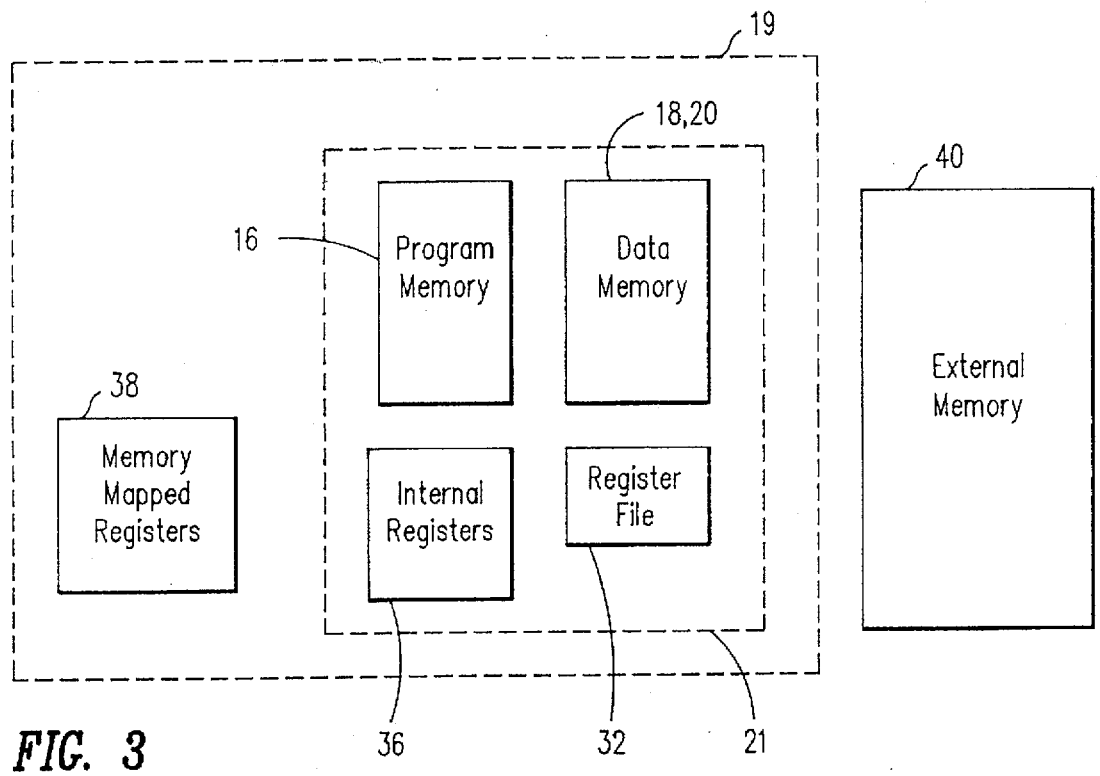
FIG. 3 shows a processor state of the ADE in terms of memory and registers.

FIGS. 1, 2 and 3 show in block diagram form the structure of a decompression circuit in accordance with the present invention. Further detail is set forth in the document entitled "Audio Decompression Engine (ADE)," which is shown in its entirety in the microfiche appendix which is a part of this disclosure.

FIG. 1 is a high level block diagram of a decompression chip which includes both audio and video decompression. Further detail is shown in the above-referenced patent application with special reference to the video decompression. The remainder of this disclosure is directed to the audio decompression function. The host BIU 10 (Bus interface unit) communicates with the host microprocessor (not shown) in the computer system. It is to be understood that as described in the above-referenced patent application, the ADE and the other functions in FIG. 1 are present in a chip which is typically present on an add-in card connected via a peripheral bus to the host processor, or is present on the computer motherboard.

The host interface unit 10 communicates via host communication registers 12 with the ADE (audio decoder engine) 14. Associated with the ADE 14 are a program read only memory (ROM) 16, a data read only memory (ROM) 18 and a data random access memory (RAM) 20. Connected via the data RAM 20 is a read/write external direct memory access (DMA) unit 22. Connected in parallel with the ADE 14 are the other modules 28, i.e. the video decompression module, to memory interface unit 24 which in turn is an interface to the private memory 26 which is used for data decompression. While the decompression function performed by the particular version of the ADE shown herein is for MPEG 1, it is to be understood that with modifications apparent to one of ordinary skill in the art, this can be adapted for MPEG 2 or for other types of audio decompression. In accordance with one embodiment of the invention the host processor performs the audio decompression tasks of bit stream parsing, scale factor and sample extraction, dequantization, and denormalization. The ADE performs the remaining tasks of filtering, windowing and sample reconstruction.

FIG. 2 shows the audio decoder engine 14 and associated elements from FIG. 1. FIG. 2 shows several subblocks of ADE 14 which include the register file 32, arithmetic logical/shift multiplier 34 and the datapath control 36 which has the function of decoding instructions and sending control signals to the rest of the chip based on the decoding.

FIG. 3 shows the processor state which consists of an array of internal (register file, hardware) registers, memory map registers and several different memory arrays. Several of these elements are common to FIGS. 1 and 2, but further shown are the memory map registers 38, internal registers 36. The external memory 40 includes the private memory. The dotted lines indicate the entire decompression chip 19 and the internal (not visible to host) ADE structures 21. The memory map registers 38 are addressed using load/store instructions. They are used for host/ADE communication. The internal registers 36 control internal facilities or operation, while the external memory mapped registers 38 control external facilities or operations; only memory mapped registers are software accessible.

The coefficient memory is a portion of the data ROM 18. This coefficient memory stores the filter and window coefficients which are required for MPEG audio decompression in address-compressed form. While as noted above conventional MPEG 1 decompression requires 2,096 such coefficients, it has been found by the present inventors that symmetries inherent in these coefficients allow storage of only a subset of the coefficients while still allowing full decompression functionality. The addresses for the coefficient memory are a word (not byte) address. The coefficient memory also includes dedicated logic to convert logical coefficient addresses used by the ADE microcode to a physical coefficient address which points to the actual data in the coefficient memory read only memory. The logical to physical address conversion decompresses the coefficients back to the order which is easily used by the ADE microcode, which is described in further detail below. Additional negate logic is provided because in addition to address decompression, some of the coefficient values are negated before use as explained further below.

FIG. 4 shows the organization of the coefficient memory. This includes both the filter coefficients and the window coefficients.

MPEG Audio filter coefficients are signed fractions in the range (−1.0, +1.0), since they are all cosine values. The are represented as Q15 fixed-point 16-bit numbers (−1.0= 8000h, 0.999=7FFFh). Originally there are 2048 coeffs (4 KB), but using symmetry, this is reduced to 496 words (992 bytes), as follows. There are 64 groups (m) of 32 coefficients (n) described by:

FLT[32*m+n]; m=0..63, n=0..31.

$$FLT_{mn} = \cos\,[(16+m)*(2*n+1)*pi/64]$$

Each group is linear in phase (has mirror symmetry or anti-symmetry within the group), and most groups have an identical or negated group match, as summarized below:

groups 0–15 are the negative of groups 32–17 (reverse order);

group 16, all coefficients are 0, and not stored in the ROM;

groups 33–47 are the same as groups 63–49 (reverse order);

group 48, all coefficients are −1.0, and not stored in the ROM.

Based on the above, the required space is 31 physical groups of 16 words each (due to linear phase), equalling 496 words, corresponding to 31 logical groups of 32 words each.

Thus the filter coefficients occupy the first 496 words of the coefficient memory physical address, and the first 992 words of logical address. The conversion from logical to physical address is carried out by circuitry which functions as follows:

la[9:0] is converted to pa[8:0]

pa[8..4]=la[9..5]; the upper 5 bits are identical.

if (la[4..0]<16)

pa[3..0]=la[3..0]; the 4 physical lsbs (least significant bits) are an up-down mirror of 5 logical lsbs.

else pa[3..0]=31−1a[4:0];

In addition to physical address, a Negate signal is generated, to negate the correct coefficients. Negate is active in the second half of all the odd-numbered filter groups.

The MPEG original window coefficients are signed fractions in the range (−1.145, +1.145). There are 512 window coefficients (1 KB), but coefficients 1−255 are a negated mirror of coefficients 257−511 (with 3 exceptions; coefficients 64, 128, 192 are same as coefficients 448, 384, 320, respectively), while coefficients 0 and 256 are unique. Thus, only 257 unique coefficients (514 bytes) are stored.

The first 256 window coefficients are read normally in sequential order with no negation. The last 256 coefficients are read in reverse order, and with negation (except for coefficients 320, 384, 448). Reading the second half of the window coefficients is controlled by software, and assisted by hardware. The hardware implements an up/down counter, and the software controls which mode (up or down count) is used.

Figure 5:
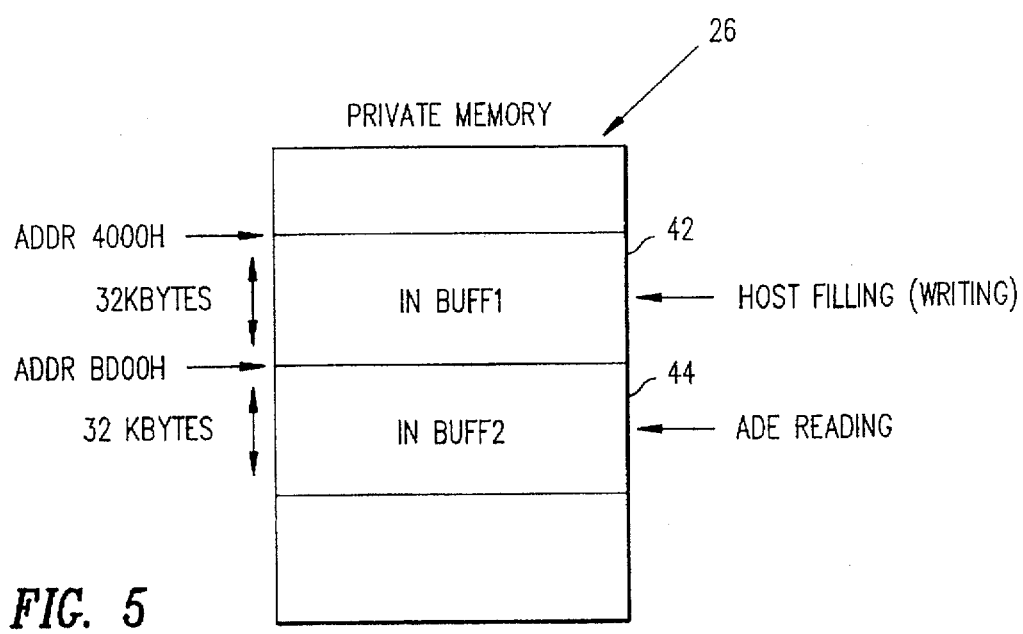
FIG. 5 shows double buffering in accordance with the present invention.

The interaction between the host processor and the ADE in accordance with the invention uses double memory buffering. In accordance with the invention both input and output buffers are doubled buffered, in addition to an ADE request memory structure which passes basic information to the audio decoder engine before a decompression command is given. The commands are passed through one of two host flag registers which are used in a similar double buffering method. The available host flag register is indicated by a bit in the ADE flag register. Each of the double buffered sets has a second of the double buffers contiguous to the first buffers. This is shown in FIG. 5 with the input buffer 42 having the host processor filling (writing) data into the first input buffer 42 at the same time that the ADE is reading data from the second input buffer 44.

The host processor writes to the first part of the input buffer. The second part of the input buffer has been previously filled by the host processor. The ADE reads from the second part. When both the host processor and ADE are ready, the ADE will start to read from the first part of the buffer and the host processor will be writing to the second part.

Since the double buffered sets each have the second of the double buffers contiguous to the first buffer in the private memory 26, the host processor needs to pass only the address and size of one buffer in order for the ADE to locate in private memory 26 both buffers of each set. Thus, both buffers are of the same size in each set, and in the case of the input and output buffers have a minimum size of 32 words for monophonic audio data and 64 words for stereophonic audio data. The input and output buffers are also a multiple of 32 words for monophonic audio or 64 words for stereophonic audio. The size of the buffers can vary; there is a restraint only on minimum size. As an example, input and output buffers 42, 44 are each 32 Kbytes in size.

The use of such double buffers allows for a more efficient decompression process. Typically the host processor will write to the ADE request data structure, which then will contain the addresses of the input and output areas in addition to data specific information and also includes the addresses of both of the input buffers before starting the ADE to begin a decompression operation. When the ADE completes the first command, the second buffer is already prepared so the ADE can start the next command immediately. While the ADE works on this command, the host processor fills the previously empty input buffer and reads out from the correct output buffer. In addition, in the case of a partial decompression, the ADE requires additional information from the address request data structure and reads out this information from the appropriate half of the double buffer.

There are three ways the ADE is triggered to start a command. The first method is a manual start. In this case, the host writes to e.g. bit 3 in the appropriate host flag register. The ADE starts immediately and also resets bit 3. The other two starting methods involve interrupts. The host sets a bit in the appropriate host flag register to indicate that the ADE should start on the next interrupt, either an Audio Interrupt (AIRQ) or a High Water Audio Interrupt (HWAIRQ). The AIRQ start corresponds to e.g. bit 5 in the host flag register and the HWAIRQ start corresponds to e.g. bit 4 in the host flag register. When either of these bits are set, the ADE will wait until it has finish the previous command, then start on the next interrupt, either the AIRQ if bit 5 is set or the HWAIRQ if bit 4 is set. The AIRQ is actually generated by the ADE when it finishes a command. It will then send a pulse to the timer, which will send it immediately back as an interrupt. This is the fastest start method. The HWAIRQ is generated when a specified amount of output data is consumed by the audio digital to analog converter. The interrupt is generated by the memory interface unit and sent to the ADE. This start method will keep the output buffer full and not allow the ADE to overflow the output buffer.

The data memory 20 of FIG. 1 in one embodiment is static RAM only. It is for instance 128 by 16 bits (256 bytes) single port synchronous RAM. The output from this data memory 20 has two destinations. One is a destination multiplexer for memory reads and the second is a 16 bit pipeline register for register substitution reads. (See FIG. 7 for further detail). This data memory is used primarily to store flags and variables associated with the decompression process such as input and output buffer addresses and private memory. The data memory may also be used to store the number of samples to be decompressed and pointers to work areas in private memory.

Private memory 26, as shown for instance in FIG. 1, is used to store the actual data samples and intermediate stages of the data during decompression. All the double buffered memory areas described above reside in private memory 26, including input and output buffers. In addition, the private memory 26 includes a 4K byte workspace that the ADE uses to store intermediate data during a decompression process. At the end of a decompression command, the ADE writes the output samples to private memory 26. The ADE request memory structure also resides in private memory. Through this ADE request memory structure, the ADE receives from the host processor the necessary flags and information to execute a decompression process.

As described above, in accordance with the invention audio MPEG decompression is partitioned in terms of functionality between a host processor which is e.g. the microprocessor conventionally present in a computer system and the ADE which is a digital signal processor. Since in one embodiment the ADE performs only the filtering and windowing portions (layers) of audio MPEG 1 decompression, the audio data must also be preprocessed by the host processor to perform the upper level (layer) decompression tasks. These upper level tasks include parsing the system data stream into audio and video streams, decoding the scale factors, and requantizing of the samples. In addition, the host processor performs some post processing, in which the host processor adds a header onto the data output by the ADE.

Figure 6:
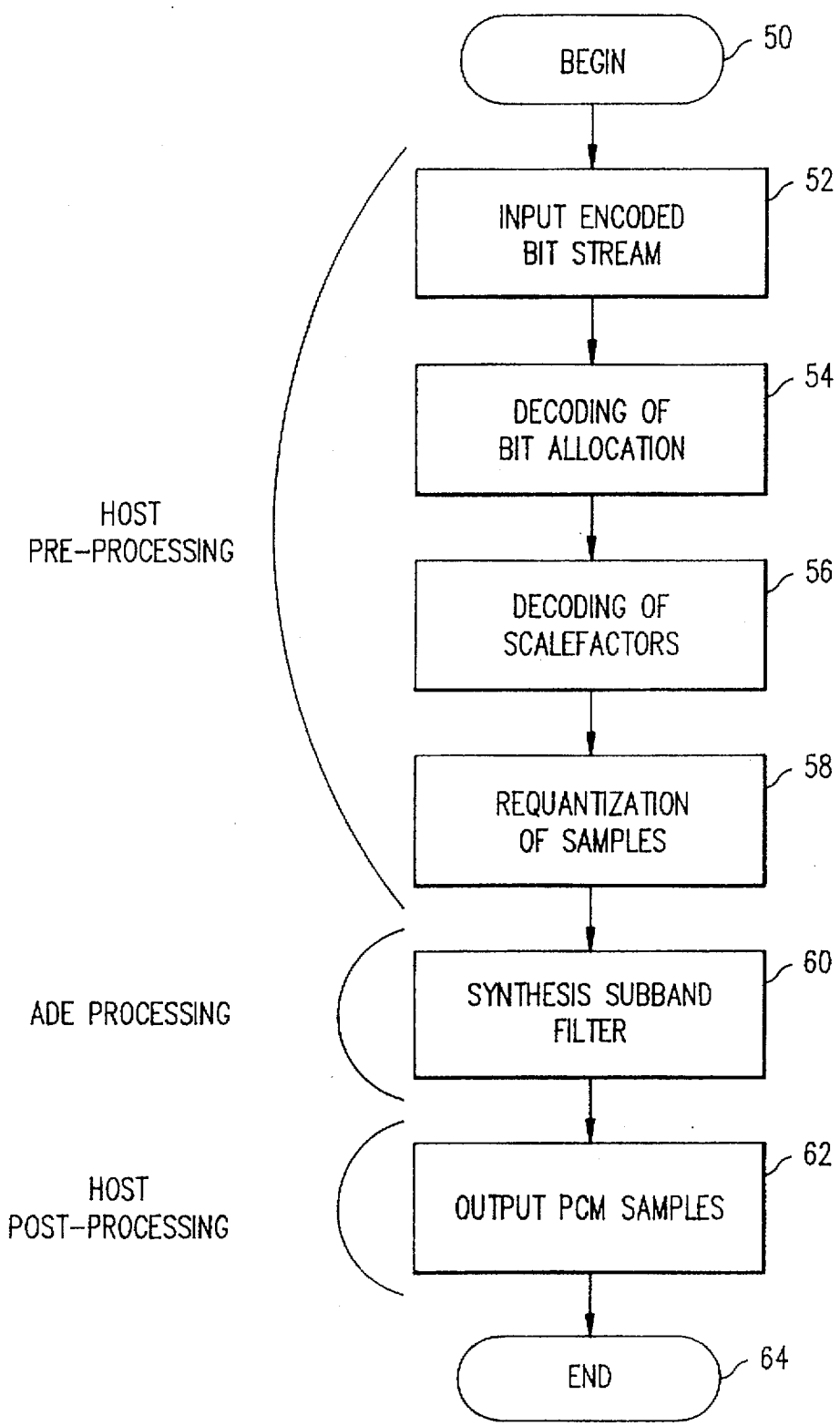
FIG. 6 shows partitioning of decompression between a host processor and the ADE.

As shown in FIG. 6, the host processor performs the preprocessing steps 50 through 58. These steps are conventional MPEG audio decompression steps, and hence not described in further detail herein. Beginning with step 50, the compressed data is encoded into a bit stream in step 52. In step 54 this encoded bit stream is decoded in terms of bit allocation. Then the scale factors are decoded in step 56. The samples are then requantized in step 58. After this preprocessing, the host processor places the partially decompressed samples from step 58 into the correct half of the input buffer as described above, with each sample being a word in size (16 bits). For a monophonic audio decompression operation, the buffer size is a minimum of 32 sample sizes. For a stereophonic operation, the minimum buffer size is 64 sample sizes. This is because (in one embodiment) the ADE decompresses the samples in groups of 32. Hence the buffer sizes are multiples of the corresponding minimum size as described above with reference to the double buffers.

Then with reference again to FIG. 6, ADE processing takes place in step 60. The ADE retrieves the pre-processed samples (32 at a time for monophonic audio and 64 at a time for stereophonic audio). The ADE then filters and windows the samples using the filter coefficients and window coefficients as described above. This is shown in FIG. 6 (in summary) as a synthesis subband filter process. This process involves multiple reads and writes to the private memory 26 of the decompression chip, in addition to execution of the arithmetic commands that the ADE executes. At the end of step 60, the ADE produces the samples to be written to the output buffer. These samples are the same size as the input samples (16 bit and the same in number), but of different values. In addition, if the audio data processed was stereophonic, then the output samples are left and right channel interleaved. Then in step 62 the host processor places the header on the output data in a PCM (pulse code modulation) form which then at the end step 64 may be played by the computer sound system.

The host processor carries out steps 50 through 58 and 62 by means of a computer program (software driver). An example of such a computer program is shown in the microfiche appendix and is entitled "MPEG.C" This program is in a combination of "C" and Assembler languages. This MPEG decompression is conventional in terms of the individual decompression steps; however the present partitioning between the host and the ADE is novel and advantageous in accordance with the invention. Even without reference to the computer program in the microfiche appendix, one of ordinary skill in the art could write the requisite computer program given the well-known MPEG decompression process and the description provided herein.

Further detail of the ADE is provided in the above mentioned specification which is a part of the microfiche appendix. Further, the ADE operates by executing resident microcode. An example of suitable microcode is in the microfiche appendix and entitled "Prima P1 Mpeg Audio Decoder Code for ADE". While this microcode is provided for illustration, one of ordinary skill in the art could write such code and provide ADE circuitry for carrying it out in accordance with the invention in light of this specification without reference to the appendix, since again the actual MPEG decompression is well known. It is to be noted that the microcode of the microfiche appendix is to be understood with regard to the above-referenced ADE specification which refers to the various commands and registers.

Figure 7:
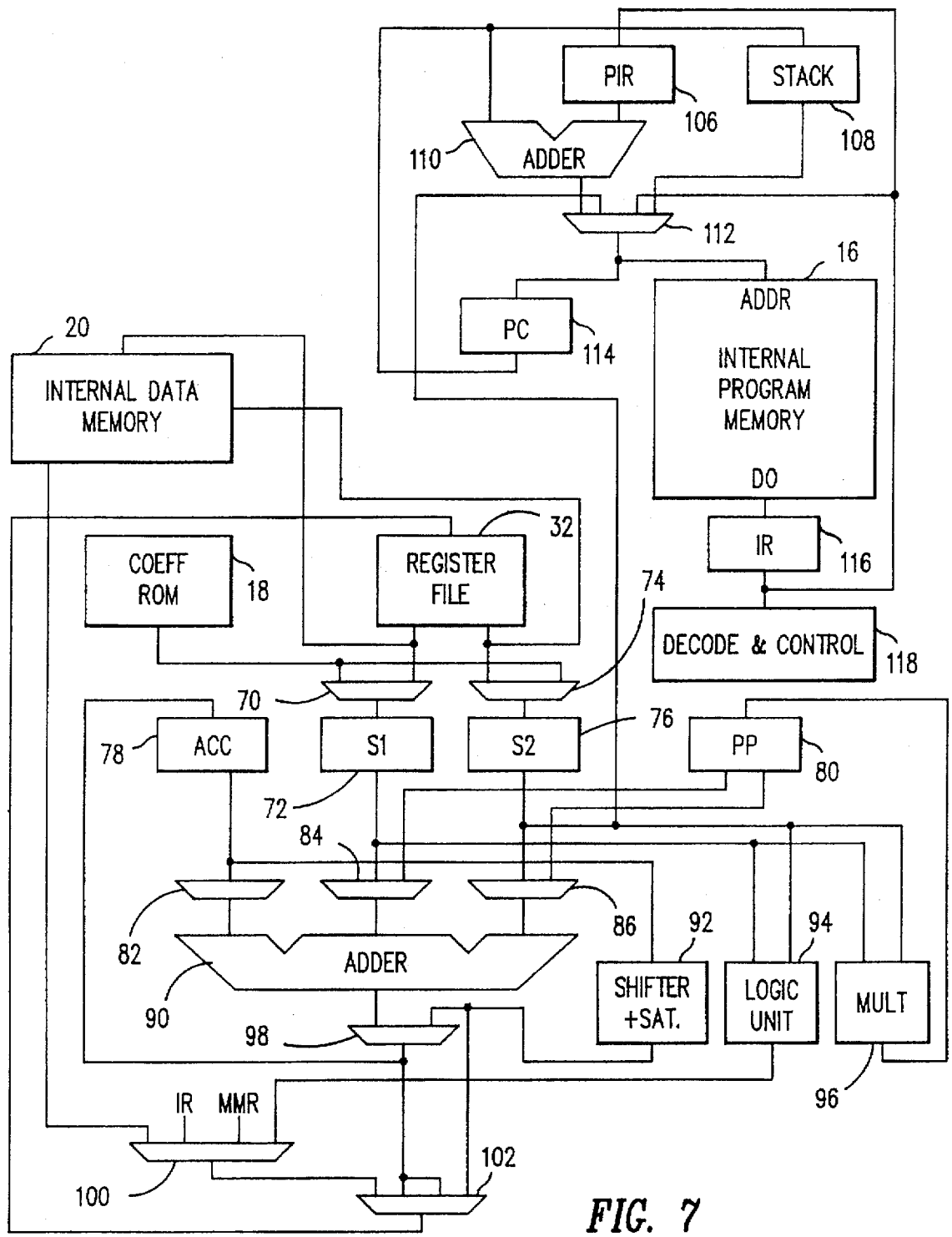
FIG. 7 shows a block diagram of the ADE.

A detailed block diagram of the ADE is shown in FIG. 7. Certain of the elements are the same as mentioned above. Shown in greater detail in FIG. 7, as compared to FIG. 2, are the arithmetic logical/shift multiplier and the datapath control functions.

The register file 32 includes sixteen registers, covering the full four-bit register address space. There are two read ports and one write port. Each register is 16-bits wide (one word). Only word access mode is supported. Two source multiplexers 70, 74 are connected to the output ports of register file 32 and have their output terminals connected respectively to source registers S1 72 and S2 76. Multiplexers 72, 76 select between register-file outputs and other data sources. Another source register is the accumulator ACC 78. The three registers 70, 72, and 76 are connected respectively to multiplexers 82, 84 and 86 each having as a second input an output from one of the shifter 92, logic unit 94 or multiplier 96. The outputs of multiplexers 82, 84 and 86 are connected to adder 90. This is a 36 bit carry lookahead adder. The output of adder 90 is connected to a cascaded set of multiplexers 98, 100, 102 which together form a result multiplexer selecting between the adder 90, shifter 92, logic 94, and internal data memory 20, intermediate output IR (instruction register output), or MMR (memory mapped register output) as shown.

The lower right hand portion of FIG. 7 shows the partial product register 80 which is connected to multiplier 96 which is a 16 by 16 multiplier implemented using Booth's algorithm retiring two and one half bits per stage. The complete operation requires a network of carry-save adders followed by a carry propagate (look ahead) adder. To improve the multiply throughput, a pipeline stage is inserted between the carry same adders and the carry propagate adder. The two inputs are the multiplier and the S1 register 72 and the multiple and the S2 register 76. The partial product register 80 stores the partial product of the multiplier's carry save adder trees. The partial product register 80 includes two thirty bit registers containing the carry and sum result component results of the multiplier. These two components are summed in the adder 90.

The shifter 92 is implemented as a four input multiplexer. Four shift options are supported which are no shift, left shift 1 bit, left shift 2 bits, and right shift 1 bit. The logical unit 94 is 16 bits wide and executes logical operations conventionally.

The upper right hand portion of FIG. 7 shows the ADE program sequencer. This includes a PIR (previous instruction register) used to store the immediately previous instruction, the output of which is connected to adder 110 which in turn is connected to a multiplexer 112, the other inputs of which are provided from a stack 108 used for call/return only. The output of multiplexer 112 is connected to program counter register 114. The output of multiplexer 112 is also connected to the address port of internal program memory 16, the output port of which is connected to IR (instruction register) 116, the output port of which in turn is connected to instruction decode and control register 118.

Further detail is set forth in the specification in the microfiche appendix.

This disclosure includes copyrighted material. The copyright owner gives permission for a facsimile reproduction of material in Patent and Trademark Office files and of the patent document, but otherwise reserves all copyright rights whatsoever.

This disclosure is illustrative; further modifications will be apparent to one of ordinary skill in the art in light of this disclosure and are intended to fall within the scope of the appended claims.

We claim:

1. A method in a computer system of decompressing audio data that has been subject to compression, the computer system including a host processor connected via a peripheral bus to a secondary processor, the method comprising the steps of:

first partially decompressing the compressed audio data in the host processor; and then partially decompressing the compressed audio data in the secondary processor, wherein the secondary processor performs the more computationally intensive decompression.

2. The method of claim 1, wherein the secondary processor is a digital signal processor.

3. The method of claim 1, wherein the secondary processor is a dedicated MPEG audio decompression circuit.

4. The method of claim 1, wherein the host processor performs the steps of:

decoding an incoming bit stream;

decoding scale factors in the incoming bit stream; and requantizing samples; and wherein the secondary processor performs the steps of filtering and windowing the data.

5. A computer system adapted for decompression of compressed audio data, comprising:

a host processor;

a peripheral bus connected to the host processor;

a secondary processor connected to the peripheral bus; and means for partially first decompressing in the host processor the compressed audio data, wherein the compressed audio data is then further decompressed in the secondary processor which performs the computationally more intensive decompression.

6. The computer system of claim 5, wherein the host processor includes:

means for decoding an incoming bit stream;

means for decoding scale factors in the incoming bit stream; and means for requantizing samples; and wherein the secondary processor includes a subband filter.

7. A processor adapted for decompression of compressed audio data, the processor being for use in a computer system having a host processor, a peripheral bus connecting to the host processor, the host processor performing a first upper level portion of the decompression, the processor including:

a port for connecting to the peripheral bus; and an audio decompression engine adapted for performing a second lower level portion of the audio decompression which is computationally more intensive.

8. The processor of claim 7, wherein the audio decompression engine is dedicated to decompression of audio data which has been compressed using MPEG compression.

9. The processor of claim 7, wherein the audio compression engine includes:

means for subband filtering the compressed audio data;

means for windowing the filtered audio data; and means for sample reconstruction of the windowed audio data.

* * * * *